May 14, 1957 R. J. KERNODLE 2,791,858
FISHING LINE BRAKE
Filed July 18, 1955
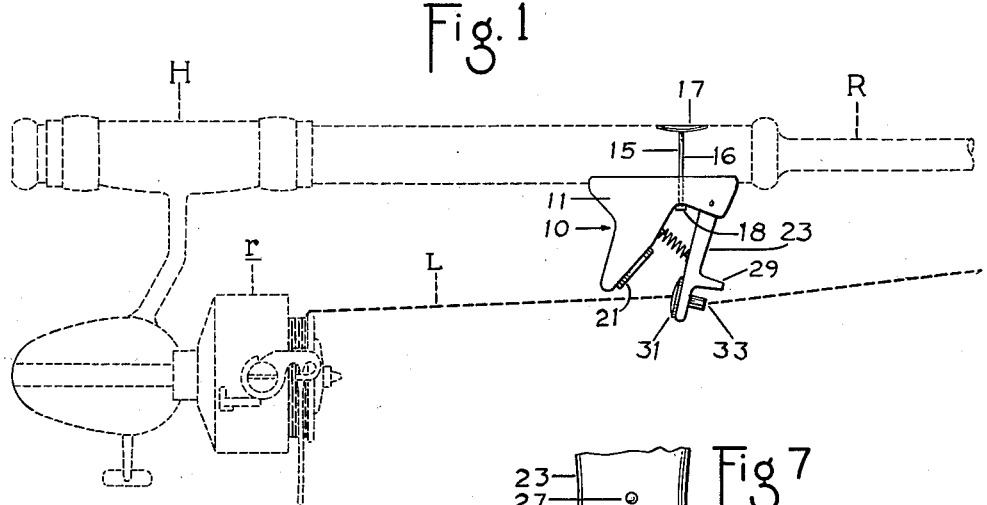
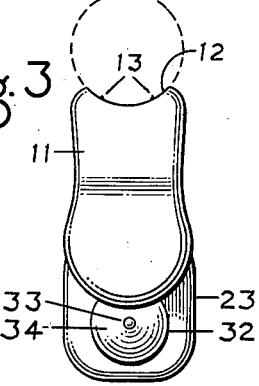
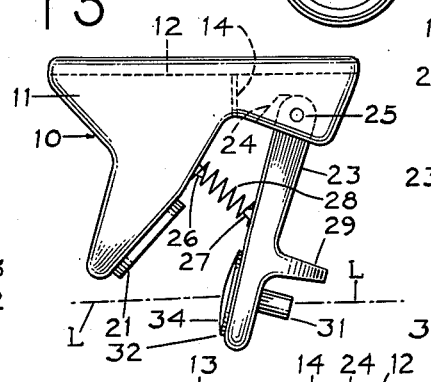
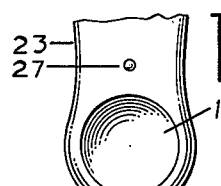
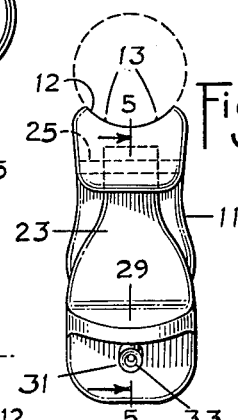
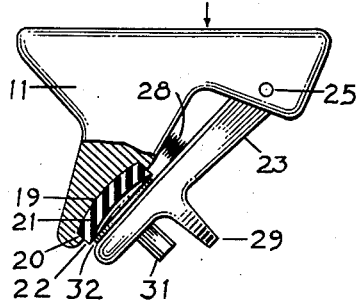
RALPH J. KERNODLE
INVENTOR.
BY
ATTORNEY

2,791,858
FISHING LINE BRAKE
Ralph J. Kernodle, Decatur, Ill.

Application July 18, 1955, Serial No. 522,419

2 Claims. (Cl. 43—25)

This invention relates to a fishing line brake.

More particularly, the invention relates to a brake device adapted for removable attachment to a standard tapered fishing rod in advance of a line supporting reel thereon and in a position for ready control thereof by a finger of a fisherman's hand engaged with and supporting the rod.

A primary object of the invention is to provide a fishing line braking and controlling device which provides for convenient and sensitive control of a fishing line paid out from a reel on a fishing rod whereby casting operations are capable of being carried out with greater ease and accuracy and also the heretofore experienced whipping action of the line is substantially overcome.

A further object of the invention is to provide a fishing line brake device which is of highly simple construction and which includes line traversing and engaging means of such form as to substantially avoid wear of the line.

Other objects and advantages of the invention will become apparent in the course of the following detailed description, taken in connection with the accompanying drawing, wherein—

Fig. 1 is a side elevational view showing the butt end of a standard fishing rod in dotted lines as well as a line supporting reel supported thereby, and wherein the line brake device in accordance with the present invention is shown in full lines.

Fig. 2 is a side elevational view of the improved brake device with the trigger in normal open or inactive position and wherein a portion of the fishing line is shown in dotted lines.

Fig. 3 is a rear elevational view of the brake device of Fig. 2 with the fishing rod indicated by a dotted circular line.

Fig. 4 is a front elevational view of the brake device of Fig. 2 and with the fishing rod indicated by a dotted circular line.

Fig. 5 is a vertical longitudinal sectional view of the brake device as observed in the plane of line 5—5 on Fig. 4.

Fig. 6 is a view partially in side elevation and partially in vertical longitudinal section and wherein the trigger is fully closed.

Fig. 7 is a fragmental elevational view showing in particular the concave socket in the body of the brake device.

Referring now in detail to the drawing, the butt end of a standard form of fishing rod is designated as R and which includes a handle H beneath which and to which is suitably secured a standard form of line reel r and a fishing line L extends forwardly of the rod R from the reel r and through usual guides supported by and beneath the rod.

Supported by the rod R adjacent the handle H is the improved line brake device which is designated in its entirety as 10.

The brake device 10 comprises a body portion 11 of generally triangular form in side elevation and which at its upper side is provided with a concave channel 12 for receiving the rod R and the wall of said channel is provided with a pair of laterally spaced parallel ribs 13 which are engageable with the rod.

The body portion 11 is further provided with a bolt receiving aperture 14 for alignment with an aperture 15 in the rod R and a bolt 16 is extended through the apertures 14 and 15, the head thereof being countersunk in a conventional oval plate 17 engaged with the upper wall of the rod and a nut 18 is applied to the threaded end of the bolt and upon turning up of which the ribs 13 will be drawn into tight engagement with the lower wall of the rod whereby the body portion 11 is rigidly secured to the rod R.

The body portion 11 adjacent its lower end is provided with a concave socket 19 having a circumscribing cylindrical wall 20 and a rubber disk 21 has its cylindrical edge wall 22 frictionally engaged with said wall 20 whereby it remains in the socket and normally in a flat condition, as indicated in Fig. 5, with the inner face thereof normally spaced from the bottom of the socket 19. The disk may, however, be turned on its axis to maintain smooth portions for engagement by the lines.

A brake trigger 23 has one end thereof disposed within a recess 24 in the body portion 11 and is pivotally secured thereto as by a pivot pin 25.

The body portion 11 and the trigger 23 are provided with opposing studs 26 and 27 respectively and a coil spring 28 is disposed between the said body portion and trigger with its opposed ends engaged over the studs 26 and 27 and the spring normally yieldably holds the trigger 23 in an outward position, as indicated in Fig. 2.

The trigger 23 is provided with a finger engageable projection 29 intermediate its ends and the trigger is provided intermediate its free end and said projection with an aperture 30 in which is press fitted a tubular member 31 having a flanged head 32 and the central opening 33 in the tubular member extends through the head 32 and provides a guide for the line L.

The flanged head 32 is provided with a convex outer wall 34 which opposes the adjacent face of the rubber disk 21, as is particularly indicated in Fig. 5.

Having described the mechanical construction of the improved device, the operation thereof is as follows:

The brake device 10 is applied to the rod R as indicated in Fig. 1, and with the line L extending from the reel r, through the central guide opening 33 in the member 31 and thence through the usual guide eyes on the forward end portion of the rod.

A fisherman then grasps the rod handle H with his right hand with the forefinger thereof disposed against the trigger 23 from the front side thereof and bearing upon the projection 29.

As indicated in Fig. 2, the line L passes freely through the brake device and wherein the line is free to be drawn off the reel r.

The line L is completely under control of the fisherman without any grabbing thereof since a braking action on the line is readily effected to any desired degree by manipulation of the trigger 23 by the forefinger of a hand of a fisherman.

Thus, as indicated in Fig. 5, the head 32 is drawn into contact with the rubber disk 21 without any deflection thereof. This condition provides a moderate braking action on the line, as may be desired in certain casting operations.

As indicated in Fig. 6, substantially greater pressure has been applied to the trigger 23 with a resulting deflection of the rubber disk 21 and wherein the disk has been forced completely within the socket 19. This condition provides a complete braking action on the line wherein same is held against any dragging action with the bait maintained at a desired position.

The trigger may of course be subjected to various degrees of pressure between that of Fig. 5 and Fig. 6, as conditions may dictate to the fisherman.

It may be here stated that approximately four ounces pressure on the trigger holds the fish line firmly in casting lures of one-sixteenth ounce to one ounce weight while approximately three pounds pressure on the trigger holds the line firmly to cast up to four ounces or more of salt water bait.

While I have disclosed my invention in accordance with a single specific structural embodiment thereof, such is to be considered as illustrative only, and not restrictive, the scope of the invention being defined in the sub-joined claims.

What I claim and desire to secure by U. S. Letters Patent is:

1. A fishing line brake device comprising a body member for attachment to a fishing rod, a friction member supported by the body member, a finger engageable trigger having one end thereof pivotally connected to the body member remote from said friction member, a tubular member supported in the trigger adjacent the other end thereof and having a head engageable with said friction member between which the line extends, and a spring disposed between the body member and the trigger biasing said head away from said friction member, said body member being provided with a concave socket having a circumscribing cylindrical wall, and said friction member comprising a yieldable disk whose cylindrical wall is frictionally engaged with said first cylindrical wall and with the inner face of said disk normally spaced from the bottom of said socket.

2. The structure according to claim 1, wherein said head on said tubular member is provided with a convex outer wall for cooperation with the outer face of said disk.

References Cited in the file of this patent

UNITED STATES PATENTS

| | | |
|---|---|---|
| 676,348 | Bell | June 1, 1901 |
| 1,709,346 | Koester | Apr. 16, 1929 |
| 2,299,156 | Lind | Oct. 20, 1942 |
| 2,547,370 | Boyer | Apr. 3, 1951 |